United States Patent Office 2,891,411
Patented June 23, 1959

2,891,411

AUTOMATIC GEAR-CHANGE APPARATUS FOR ROAD, RAIL OR OTHER VEHICLES

William Drummond Sutherland, Isleworth, and Denis Wheatley, New Malden, England, assignors to C.A.V. Limited, London, England Application September 21, 1956, Serial No. 611,229

Claims priority, application Great Britain September 28, 1955

5 Claims. (Cl. 74—365)

This invention has for its object to provide in a simple and convenient form an apparatus for automatically controlling the action of a variable-speed power transmission mechanism on a road, rail, or other vehicle.

An apparatus in accordance with the invention comprises the combination of a plurality of electro-magnets for effecting the gear changes, corresponding relays for controlling the electromagnet circuits, each relay having a pair of windings respectively adapted for excitation by current supplied by a variable-speed dynamo and a source of substantially constant voltage, and switches operable by the driver, the various parts of the apparatus being co-ordinated and adapted to operate as herein described.

In particular the invention comprises an apparatus as defined in the preceding paragraph, in which the relays control the gear-changing electromagnets through electromagnetically operated contactors.

In the accompanying drawings,

Figure 1a is a diagrammatic part sectional side view of a part of a road vehicle provided with the invention.

Figure 1:
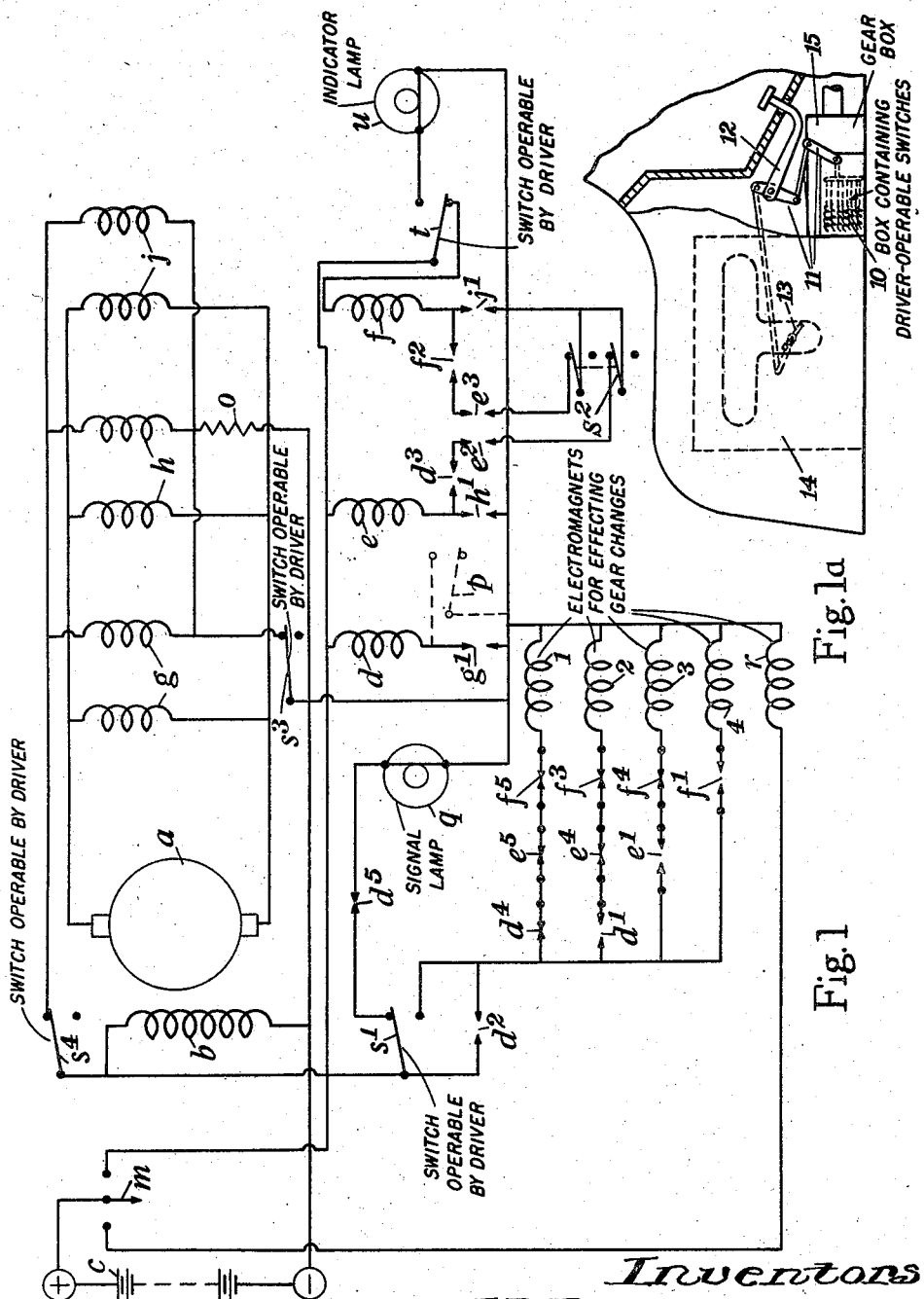
Figure 1 is a circuital diagram illustrating a typical embodiment of the invention.

Referring to Figure 1, the part $a$ represents the armature and $b$ the field winding of a dynamo which is driven at a speed related to the speed of the vehicle. It may receive its motion from, for example the propeller shaft of the vehicle. The armature is connected to a circuit which includes one of the windings of each of three relays $g$, $h$, $j$ arranged in parallel. The field winding $b$ is connected to another circuit which is supplied from a battery $c$, which latter also supplies circuit to the other relay windings, and the windings of the contactors $d$, $e$, $f$. The battery also supplies current to the gear-changing electromagnets 1, 2, 3, 4 and the reversing electromagnet $r$.

The relay $g$ actuates a normally-open switch $g1$ in series with the winding of the contactor $d$, and the latter actuates a number of associated switches $d1$, $d2$, $d3$, $d4$, $d5$ the first three being normally open and the other two being normally closed.

The relay $h$ actuates the normally-open switch $h1$ in series with the contactor winding $e$, which actuates the associated switches $e1$, $e2$, $e3$, $e4$, $e5$, the first three being normally open and the other two being normally closed.

The relay $j$ actuates the switch $j1$ in series with the winding of the contactor $f$, and the latter actuates the associated switches $f1$, $f2$, $f3$, $f4$, $f5$, the first two of which are normally open, the other three being normally closed.

In addition the apparatus is provided with other switches $s1$, $s2$, $s3$, $s4$, which are operated by the driver through a connection with the accelerator pedal of the vehicle. These switches are contained in a box 10 (Figure 1a), and are connected by link-and-lever mechanism 11 to the accelerator pedal 12 which serves in the usual manner to actuate the throttle valve 13 of the engine 14, the gears operable by the relays above mentioned being contained in a box 15.

The battery-fed windings of the relays $g$, $h$, $j$, are interconnected at one end, and at this end they are connected to one side of the battery circuit through a re-resistance $o$ which is normally short-circuited by the switch $s3$.

The apparatus also includes other features which will be mentioned in the following description of the mode of action of the apparatus.

When the vehicle is at rest and the two-way main switch $m$ is open, the various contactor and accelerator-actuated switches are in the condition shown in the diagram. On closing the main switch $m$ in the direction for connecting the battery to the field winding of the dynamo and one of each of the relay windings, current passes to these windings and also to a signal circuit which contains a lamp $q$ or other device for informing the driver that the system is in condition for starting the vehicle. In this condition the current supplied to the relays is inadequate to effect actuation of any of them, the purpose of the current being to relieve the dynamo of the duty of supplying the whole of the magnetising current when the dynamo is rotating at a relatively low speed.

A small opening movement now given to the fuel throttle by the accelerator pedal causes the switch $s1$ to be moved to its other position in which it opens the signal circuit and closes the circuit connected to the gear-changing electromagnets. Current now passes to the electromagnet winding 1, and causes the low-speed gear to be brought into action. When the speed of the vehicle reaches a predetermined rate, the voltage then generated by the dynamo will be sufficient to supply the additional current required for bringing the relay $g$ into action. The effect of this is to close the switch $g1$ and so cause the contactor $d$ to close the switches $d1$, $d2$, $d3$, and open the switches $d4$, $d5$. The closing of $d1$ causes the gear-changing electromagnet 2 to be energized for changing the gear from the first speed to the second. The closing of $d2$ short circuits the switch $s1$, and the opening of $d5$ puts the signal circuit out of action. The opening of $d4$ puts the first speed electromagnet 1 out of action and the closing of $d3$ prepares the associated circuits for later action.

With continued increase of speed (assuming no further movement of the accelerator) the relay $h$ becomes operative, and the effect of this is to close the switch $h1$ so causing the contactor $e$ to change the speed from second to third, at the same time rendering the electromagnet 2 inoperative. When a still higher speed is reached the relay $j$ closes the switch $j1$, so causing the contactor $f$ to become operative for bringing the electromagnet 4 into action, it being understood that the various switches associated with the contactors $e$, $f$ are actuated in a like manner to those associated with the contactor $d$.

If the driver wishes to start at the second speed, he closes a normally-open switch $p$ which short-circuits the switch $g1$ thereby enabling the contactor $d$ to operate independently of the rest of the system after the main switch $m$ has been closed.

After the top-speed electromagnet 4 has been energised, further increase of speed is obtained in the usual manner by further depression of the accelerator pedal. This will result in opening of the switch $s2$, and in this condition fall of speed on a rising gradient will cause the gears to be changed automatically in the downward direction.

A further movement of the accelerator pedal will open the switch $s3$. The effect of this is to bring the resistance o into action, so (by reducing the effect of the current supplied to the relays by the battery) necessitating a higher dynamo speed for actuating the relays. Still further movement of the accelerator will open the switch s4, and then the relay current is supplied wholly by the dynamo.

When the driver wishes to bring the vehicle to rest by coasting from the top-speed with the electromagnet 4 in action, he causes switch s2 to be re-closed. The effect of this is to keep the electromagnet 4 in action until the vehicle has reached a low speed or has come to rest. A similar action is obtained if it is desired to coast with the third speed engaged, that is with the electromagnet 3 in action. On attaining the rest condition the relays, contactors and gear-changing electromagnets resume their initial condition in readiness for the next start.

To enable the driver to avail himself of the braking power of the engine, when the latter is driven by the momentum of the vehicle a manually-operable switch t is provided. This switch is connected to an additional circuit containing a lamp u or other indicator, the winding of the contactor f being thereby rendered inoperative, so causing the gears to change from top speed to the third speed.

For reversing the direction of the vehicle, the main switch m is actuated for enabling current to be supplied from the battery to the gear-changing electromagnet r which brings the reversing gear into action.

Figure 2:
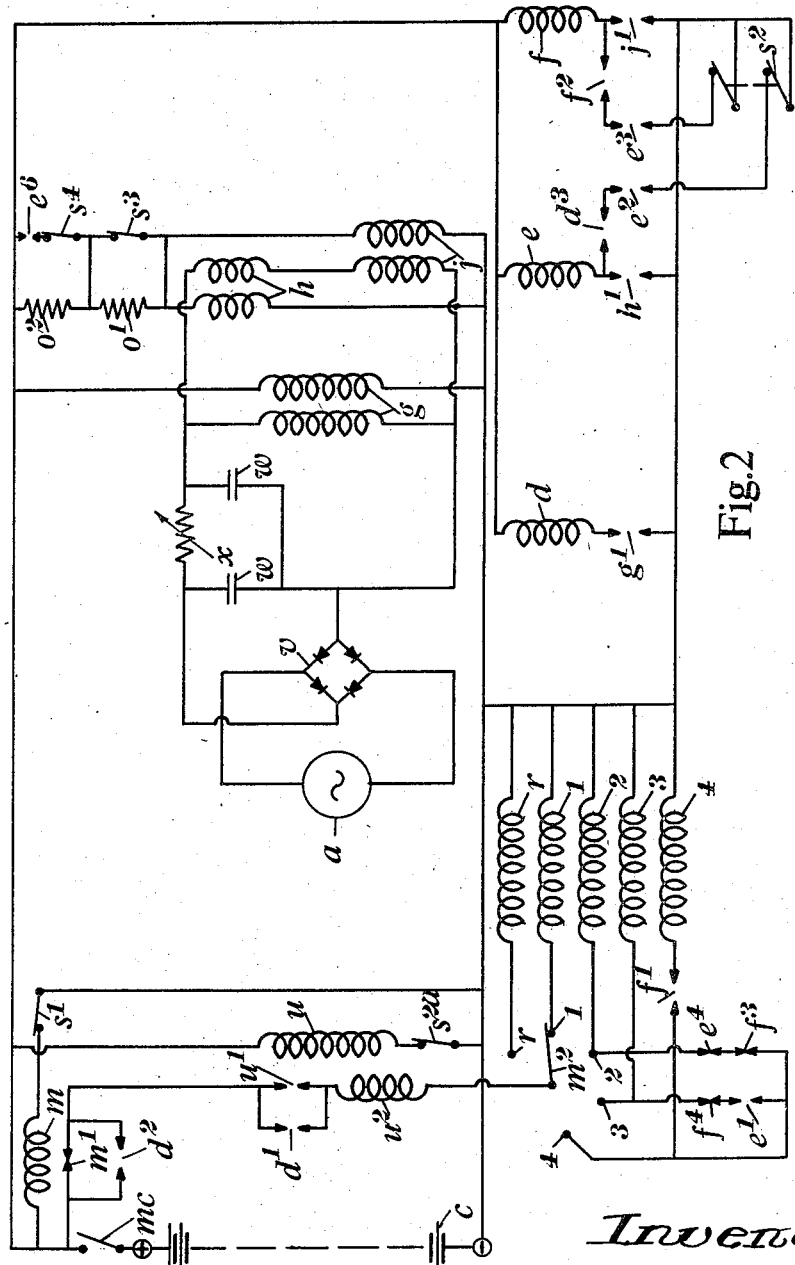
Figure 2 is a similar view to Figure 1 illustrating another embodiment of the invention.

The embodiment of the invention illustrated by Figure 2 is essentially similar to that shown in Figure 1, but differs in the following particulars. The generator a is an alternating current generator which supplies current to the relays g, h, j through a rectifier v, and a smoothing circuit which includes condensers w and a variable resistance x which latter may be adjustable to suit different speeds. This current supply means may also be used in the arrangement shown in Figure 1.

As regards the relays g, h, j, these differ in that one of the windings of relay j is arranged in series with one of the windings of the relay h as shown. In series with the other windings of the relays h and j are connected two resistances o1, o2, which are bridged by a pair of normally closed switches s3, s4.

The control switch mc is a simple one-way master switch. In association with windings of gear-changing electromagnets is provided a selector switch m2 which is manually operable for bringing into action the winding r of the reverse gear electromagnet or the electromagnet windings 1, 2, or 3. Control of winding 4 by the switch m2 is always effected automatically when the switch is put into position 4. With the switch m2 in this position the automatic change from 2 to 3, and from 3 to 4, is dependent on the vehicle speed and the position of the accelerator pedal, as already described with reference to Figure 1. The electromagnet 1 of the first speed is brought into action by manual actuation of the switch m2.

With the accelerator in the idling position, the switch marked s1 will be closed and a relay m is energised. Contacts m1 will thereby be opened. In this condition no current can pass through the switch m2, and none of the gears can be brought into action. The gears will therefore be in their neutral position when the driver takes his foot off the accelerator pedal, unless the vehicle is running sufficiently fast for relay d to be energised and the contacts d2 to be closed, these contacts being arranged in parallel with the contacts m1.

Relay u is energised until the accelerator is partly opened. It then closes the switch u1, to supply current to the switch m2. If the accelerator is too widely open for starting from rest, relay u is de-energised, and the switch u1 is opened to interrupt the current supply to the switch m2. Hence, initial engagement of any of the gears cannot be achieved if the accelerator is too widely open. The winding u2 is a series winding which can hold the switch u1 closed in operating conditions with the switch s2a open. This latter switch may be combined with the switch s2.

The contacts of the switch u1 are shunted by a pair of contacts d1 so that there is always a supply of current to the switch m2 when the vehicle is running sufficiently fast for the relay d to be energised.

Except when the master switch mc is open, the battery fed windings of the relays g, h, j, are never completely disconnected from the battery as they may be in the Figure 1 arrangement. They are connected through o1 only or through both o1 and o2 according to the position of the accelerator pedal. In addition there may be (and preferably is) provided a switch e6 which is operated by relay e and arranged to prevent this relay from operating in the speed-increasing direction until a higher speed is attained than that at which the change occurs in a decelerating direction.

The invention is not, however, restricted to the above examples, and when the gear box is adapted to provide less or more than four speed changes, the number of relays and associated parts is correspondingly changed. Also details of the switching means may be modified to suit different requirements.

Having thus described our invention what we claim as new and desire to secure by Letters Patent is:

1. An automotive vehicle speed gear control apparatus comprising a potential energy source, a plurality of normally deenergized divers speed gear selective relays, a normally deenergized reversing gear control relay, normally ineffective rotating potential generating means for developing a potential having a magnitude correlative to the speed of the automotive vehicle subsequent to being rendered effective, a plurality of normally unactuated relay circuit means for discretely energizing successive ones of said speed gear selective relays in response to the potential magnitude applied thereto by said potential generating means, manually operated circuit selector switching means for rendering said potential generating means effective and for effecting alternative energization of said plurality of speed gear selective relays and said reversing gear control relay, and a plurality of vehicle acceleration pedal responsive circuit switching means for effecting selective energization of said plurality of divers speed gear selective relays independently of the potential magnitude developed by said potential generating means.

2. An automotive vehicle speed gear control apparatus according to claim 1 and including circuit means responsive to the operation of said manually operated circuit selector switching means for visually indicating said rotating potential generating means being rendered effective.

3. An automotive vehicle speed gear control apparatus according to claim 1 and further including another manually operated circuit selector switching means for rendering a portion of said relay circuit means ineffective thereby to effect selective energization of said plurality of divers speed gear selective relays independently of the potential magnitude developed by said potential generating means.

4. An automatic gear-change apparatus for a road, rail or other vehicle, comprising in combination a plurality of energizable electromagnets for effecting the gear changes, a variable-speed dynamo variable in accordance with the speed of the vehicle to provide an output voltage dependent on the speed of the vehicle, a source of substantially constant voltage, a plurality of relays for energizing said electromagnets and provided with windings coupled to the dynamo and each being rendered operative at a different voltage respectively, additional windings for the relays, and switch means under control of the driver for coupling the additional windings to the constant voltage source and for controlling the current through the said additional windings.

5. An automatic gear-change apparatus in accordance with claim 4 and including electromagnetically operable contacting means controlled by at least one of said relays for controlling the current flow through said additional windings.

References Cited in the file of this patent

UNITED STATES PATENTS

| | | |
|---|---|---|
| 2,102,598 | McDill | Dec. 21, 1937 |
| 2,182,438 | Kahn | Dec. 5, 1939 |
| 2,302,005 | Caves | Nov. 17, 1942 |